Sept. 22, 1959 M. P. WINTHER 2,905,293
CENTRIFUGALLY-ACTUATED MAGNETIC PARTICLE CLUTCH OR BRAKE
Filed March 28, 1956 2 Sheets-Sheet 1
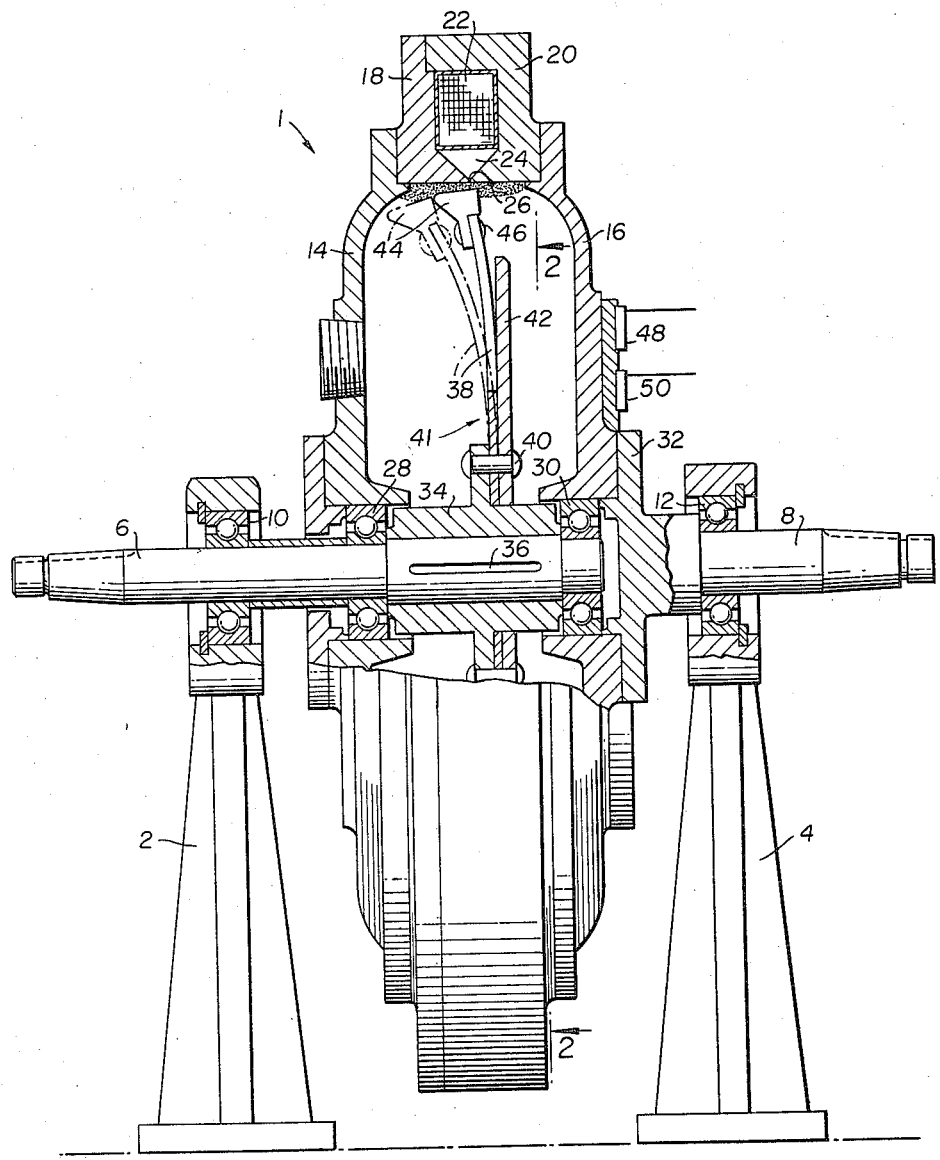
Fig. I
INVENTOR.
MARTIN P. WINTHER
BY McDonald & Teagno
ATTORNEYS Sept. 22, 1959  M. P. WINTHER  2,905,293
CENTRIFUGALLY-ACTUATED MAGNETIC PARTICLE CLUTCH OR BRAKE
Filed March 28, 1956  2 Sheets-Sheet 2
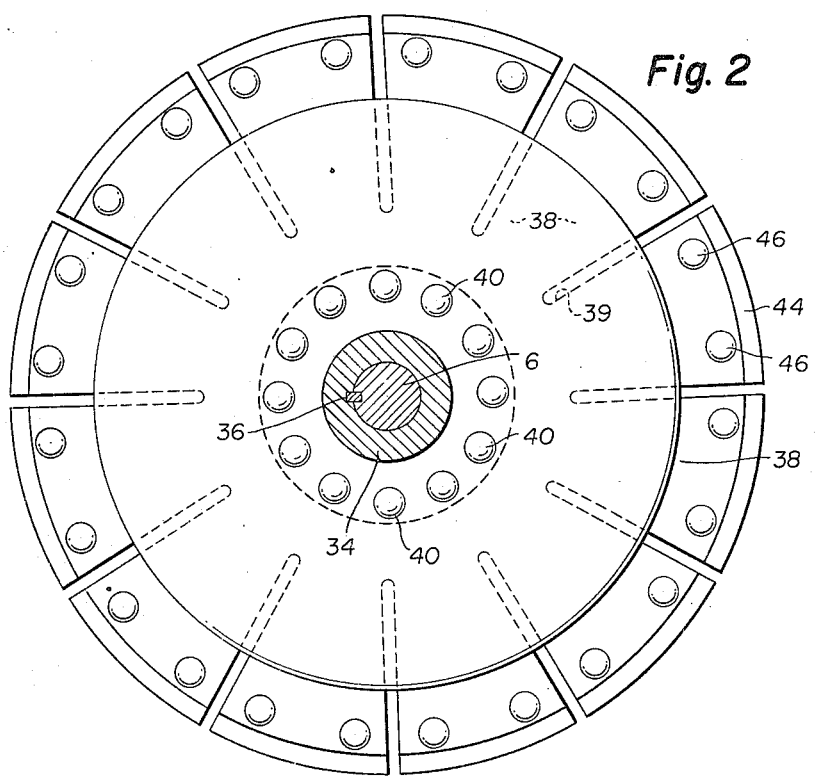
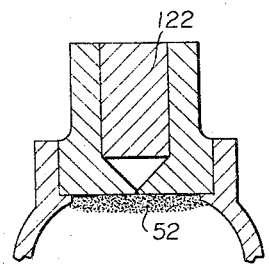
INVENTOR.
MARTIN P. WINTHER
BY McDonald & Teagno
ATTORNEYS United States Patent Office 2,905,293
Patented Sept. 22, 1959

2,905,293

CENTRIFUGALLY-ACTUATED MAGNETIC PARTICLE CLUTCH OR BRAKE

Martin P. Winther, Gates Mills, Ohio, assignor to Eaton Manufacturing Company, Cleveland, Ohio, a corporation of Ohio Application March 28, 1956, Serial No. 574,429

7 Claims. (Cl. 192—21.5)

The present invention relates to a centrifugally actuated magnetic particle torque transmitting device which has the characteristic of increased torque transmission with an increase in speed of the clutch. This result is accomplished without variation in field excitation.

It is an object of this invention to provide a magnetic particle torque transmitting device which will transmit variable torques without changing field excitation.

Another object is to provide a torque transmitting device which transmits a greater amount of torque with an increase in speed.

Yet another object is to provide a torque transmitting device which can be used as a starting clutch for devices which are driven by a constant speed machine.

Still another object is to provide a torque transmitting magnetic particle clutch which depends for energization on either a permanent magnet or an electro-magnetic coil.

These and other objects and advantages will become more apparent from the following detailed description of the device and from the accompanying drawings.

In the drawing, Figure 1 shows a side view with a portion cut away to clearly illustrate the device.

Figure 2 is an end view of the rotor member taken along lines 2—2 of Figure 1.

Figure 3 is a partial modification of the device shown in Figure 1.

Referring in detail to Figure 1 of the drawing, a centrifugally actuated particle clutch is supported by frame portions 2 and 4 which are arranged to rotatably support shaft portions 6 and 8 by conventional bearings 10 and 12, respectively. Annular dished portions 14 and 16 cooperate with annular pole pieces 18 and 20 to form an annular hollow enclosure or clutch housing. Annular pole pieces 18 and 20 are disposed in a manner to enclose an annular coil 22, and are cut away at 24 to form an annular void which is triangular shaped in cross-section, as shown in Figure 1. This arrangement provides a relatively narrow annular contact surface 26 between the annular pole pieces 18 and 20. The annular dished portions 14, 16, annular pole pieces 18, 20, and coil 22 rotate as a single unit.

The annular dished portions 14 and 16 are rotatably mounted on conventional bearing means 28 and 30 with the inner races of the bearings in axially spaced relation on the shaft 6. The hub portion 32 of shaft 8 is connected by a suitable means to the annular dished portion 16 so that shaft 8 rotates with the annular clutch housing.

A rotor hub 34 is fixedly attached to shaft 6 by a longitudinal key 36 and the rotor hub 34 has attached thereto a plurality of spoked spring segments 38. The spoked spring segments 38 are formed from a unitary spring disc 41 which is radially slotted at 39 to form the spring segments 38, and a central portion of the unitary spring disc 41 is suitably attached to rotor hub 34 by rivet or bolt means 40. A disc or plate 42 is provided to back up the spring segments 38 but is not necessary in all applications and is provided only if the diameter and weight of the rotor shoes necessitate it.

Arcuate rotor shoes 44 which are formed of magnetic material are attached by rivet or bolt means 46 to the spoked spring segments 38. Collector rings 48 and 50 are provided to transmit current to the coil 22.

The relationship of the length, cross-sectional area, and resilience of the spoked spring segments, in relation to the mass of the arcuate rotor shoes 44, forms a part of the invention. The arcuate rotor shoes are mounted on the spring segments so that the curve on the spring spokes is generated in a manner to resist the square law tractive force of the field magnet. The relationship is such that the shoes will move toward the field magnet only in response to an increase in angular velocity when there is no magnetic powder in the gap. This relationship is maintained so that the clutch will be truly speed responsive.

Magnetic particles 52 are disposed in the hollow housing and are free to move about in the housing. The volume of particles is a matter of choice but the mass of particles must be sufficient to more than fill the annular air gap between the shoes 44 and the annular contact surface 26 when the rotor shoes 44 are in the innermost position shown dotted in Figure 1. When the magnetic flux is at the maximum or working value, the magnetic particles will form a bridge across the two poles of the field magnet as shown in Figures 1 and 3.

The aforedescribed device operates in the following manner. Assume that the shaft 6 is the input shaft and the shaft 8 is the output shaft connected to the load. When the shaft 6 is rotated at a relatively low speed, the arcuate rotor shoes will move outwardly to a slight degree and as the speed of the shaft 6 is increased, centrifugal force acting on shoes 44, moves the shoes outwardly until they are in an intermediate position somewhere between the dotted line and solid line positions shown in Figure 1. As the shoes are moved from the aforesaid intermediate position to the solid line position, the shoes move into more intimate contact with the particles 52 and are increasingly affected by the magnetic field set up by the field magnet and the magnetic particles. The flux path threads through the pole pieces 18 and 20, the magnetic particles 52 and the magnetic shoes 44. The friction drive between the shoes, the magnetic particles and the casing supplements the magnetic drive set up by the shoes 44 and the field magnet. When the shoes are in the solid line position, the clutch is operating under the maximum torque transmitting condition.

If the device is to be used, for example, as a starting clutch for centrifugal pumps, fans, blowers, and the like, where the power input means is a constant speed machine, such as an A.C. electric motor, the operation is as follows:

Shaft 8 is drivingly connected to the electric motor which in turn rotates the housing at the operating speed of the motor and shaft 6 is drivingly connected to the device to be operated. Sufficient magnetic particles are provided in the interior of the housing to cause a slight friction drag on the rotor shoes 44, which in turn rotates the centrifugal blower or pump at a relatively low speed. As the speed of shaft 6 increases, the rotor shoes move outwardly into a higher torque area which results in transmission of torque at a rate which is greater than the torque requirements of the fan or pump.

Figure 3 shows a partial modification of the device disclosed in Figure 1 in which a permanent magnet 122 is used in place of a constant excitation electro-magnetic coil. The operation of the device utilizing a permanent magnet field is the same as the operation of the device disclosed in Figure 1 and need not be further explained.

It is obvious that many variations may be produced by varying the length, thickness, and curvature of the spoked spring segments, as well as the mass, peripheral diameter of the arcuate rotor shoes and the length of the gap between the rotor shoes and the pole pieces.

The novel structure herein disclosed insures a speed responsive, constant excitation type particle clutch.

While the present invention has been described in connection with certain specific embodiments, it is to be understood that the foregoing description is merely exemplary and that the concept of this invention is susceptible of numerous other modifications, variations, and applications which will be apparent to persons skilled in the art. The invention is to be limited, therefore, only by the broad scope of the appended claims.

What I claim is:

1. A torque transmitting device comprising a rotatable driving member, a rotatable driven member, an annular housing rotatably connected to one of said members, a mass of magnetic particles disposed loosely within said housing and being centrifugally distributed adjacent the periphery of the housing during rotation of said housing, an annular magnetic field generating member disposed circumferentially adjacent said housing, pole pieces enclosing said field generating member, outwardly movable spring means drivingly connected with the other of said members, magnetically permeable shoes drivingly connected to said spring means and being movable outwardly in response to centrifugal force to a position adjacent said pole pieces and defining a magnetic circuit including said pole pieces, said magnetic particles and said magnetically permeable shoes.

2. A torque transmitting device comprising an input and an output member, a housing connected to one of said members, outwardly movable magnetic shoe members drivingly connected to the other of said members, a magnetic field generating member, pole pieces adjacent said field generating member, a mass of magnetic particles disposed near the periphery of said housing during rotation of the housing, and said shoe members being movable outwardly in response to centrifugal force whereby a magnetic flux circuit is set up in said shoe members, said particles and said pole pieces.

3. A torque transmitting member comprising rotatable input and output members, a housing member connected to one of said members, said housing having disposed adjacent thereto, a magnetic field producing member, paramagnetic means disposed in encapsulating relationship with said field producing member magnetic particles disposed in the field produced by said field producing member, outwardly movable magnetic shoe members disposed in the field produced by said field producing member, said shoe members being attached for rotation with the other of said members and being moved outwardly due to centrifugal force when said other member is rotated into frictional contact with said particles whereby said input and output members are clutched together.

4. A mechanism comprising first and second members, magnetic shoes resiliently connected for selective outward movement to said first member, a casing connected to said second member, said magnetic shoes being disposed within said casing, magnetic flux field generating means adjacent said casing, paramagnetic means surrounding said flux field generating means, a quantity of magnetic particles disposed within said casing between said shoes and said paramagnetic means, said magnetic shoes being movable outwardly due to centrifugal force to a position proximate to said flux field generating means whereby a flux path is created through said paramagnetic means, said magnetic particles and said magnetic shoes.

5. A torque transmitting device comprising a first rotatable member, a second rotatable member, a casing connected to said first rotatable member, flux field generating means disposed adjacent said casing, pole pieces disposed adjacent said field generating means in a manner to produce a substantially toroidal flux path, magnetic particles disposed within said casing and being centrifugally distributed adjacent the periphery of the housing during rotation of said housing, outwardly movable spring segments attached for rotation with said second rotatable member, magnetic shoes attached to said spring segments, said shoes being disposed within said casing and normally spaced from said pole pieces, said shoes being movable outwardly due to centrifugal force to a position closely adjacent said pole pieces and said magnetic particles bridging the gap between said shoes and said pole pieces when said shoes are in said outward position.

6. A torque transmitting device comprising a first rotatable shaft, an annular housing connected to said shaft, a quantity of magnetic particles disposed loosely within said housing and being centrifugally distributed around the periphery of said housing during rotation of said housing, magnetic flux field generating means disposed adjacent said housing, paramagnetic means surrounding said generating means, a second rotatable shaft, resilient spring segments fixed to said second shaft, said spring segments having unsupported ends, magnetically permeable shoes attached to said ends of said spring segments, said shoes being movable outwardly adjacent said flux field generating means when said second shaft is rotated, said magnetic particles being disposed between said shoes and said flux field generating means in a manner to establish a flux circuit including said paramagnetic means, said shoes and said particles whereby rotation of one of said shafts imparts rotation to the other of said shafts.

7. A mechanism comprising outwardly movable magnetically permeable means rotatable with a first member, flux field generating means, paramagnetic means enclosing said field generating means, a second rotatable member, magnetic particles disposed between said magnetic means and said second member, said paramagnetic means, said particles and said magnetic means forming a magnetic flux circuit and said magnetic means being movable in response to an increase in speed of said first member to a position of increased transmission of torque from said first member to said second member or vice versa.

References Cited in the file of this patent

UNITED STATES PATENTS

| 2,643,748 | White | June 30, 1953 |
| 2,650,684 | English | Sept. 1, 1953 |

FOREIGN PATENTS

| 78,477 | Sweden | Apr. 17, 1931 |
| 80,380 | Sweden | May 8, 1934 |
| 1,111,653 | France | Nov. 2, 1955 |